United States Patent
Ishiwata

[19]

[11] Patent Number: 6,026,559
[45] Date of Patent: Feb. 22, 2000

[54] METHOD FOR FABRICATING A COMPLEX MAGNETIC HEAD INCLUDING A REPRODUCING MAGNETO-RESISTANCE HEAD

[75] Inventor: Nobuyuki Ishiwata, Tokyo, Japan

[73] Assignee: NEC Corporation, Tokyo, Japan

[21] Appl. No.: 09/225,000

[22] Filed: Jan. 4, 1999

[30] Foreign Application Priority Data

Jan. 7, 1998 [JP] Japan ................... 10-001233

[51] Int. Cl.[7] ........................................ G11B 5/42
[52] U.S. Cl. ................... 29/603.14; 29/603.15; 360/113
[58] Field of Search ............... 29/603.14, 603.15, 29/603.13; 360/113, 121

[56] References Cited

U.S. PATENT DOCUMENTS 5,802,700  9/1998  Chen et al. ................ 29/603.14
5,901,432  5/1999  Armstrong et al. ........ 29/603.14
5,916,423  6/1999  Westwood .............. 29/603.15 X

FOREIGN PATENT DOCUMENTS 6-290423  10/1994  Japan .

*Primary Examiner*—Carl E. Hall
*Attorney, Agent, or Firm*—McGinn & Gibb, P.C.

[57] ABSTRACT

A fabrication process for a complex magnetic head having a reproducing MR head and a recording ID head comprises the steps of forming the MR head, forming an insulator film on the MR head, forming a photoresist frame on the insulator film, forming a top magnetic pole inside the photoresist frame by plating, trimming the top magnetic pole for defining the end width of the ID head while leaving the photoresist frame, and removing the photoresist frame. The photoresist frame protects the underlying films against the trimming and also protects the top magnetic pole film against an etching solution.

6 Claims, 3 Drawing Sheets

METHOD FOR FABRICATING A COMPLEX MAGNETIC HEAD INCLUDING A REPRODUCING MAGNETO-RESISTANCE HEAD

BACKGROUND OF THE INVENTION (a) Field of the Invention

The present invention relates to a method for fabricating a complex magnetic head including a reproducing magneto-resistance head (MR head) and, more particularly, to a method for fabricating a complex magnetic head including a reproducing head using a MR effect and a recording head using electromagnetic induction.

(b) Description of the Related Art

A complex magnetic head is known in the art which includes a MR head and an inductive (ID) head formed on the MR head in a layered structure. In a practical complex magnetic head, the MR head is used as a reproducing head and the ID head is used as a recording head. The MR head includes a pair of magnetic shield films S1 and S2 opposing each other, and a MR element sandwiched between the magnetic shield films S1 and S2 and separated therefrom by respective magnetic separation layers acting also insulating layers.

The ID head uses the magnetic shield film S2 as a bottom magnetic pole P1, and further includes a coil and a top magnetic pole P2 on one of the sides of the bottom magnetic pole P1 far from the MR element. The coil is sandwiched between a pair of insulator films. The magnetic poles P1 and P2 are layered parallel to each other, and operate for inductive recording using a magnetic field generated in a magnetic gap between these magnetic poles P1 and P2.

With the improvement of the recording density of a magnetic recording disk, the top magnetic pole P2, which defines the recording track width on the magnetic recording disk, is required to have a smaller width at the end face thereof which is disposed on the air bearing surface (ABS) opposing the magnetic recording disk.

A fabrication process of the complex magnetic head includes the steps of forming the bottom magnetic pole P1, forming the coil insulated by insulator films and forming the top magnetic pole P2 for the ID head. In this process, it is difficult to form a small end width of the top magnetic pole P2, because the photoresist frame for defining the shape of the top magnetic pole P2 is formed directly on the insulator film which has a larger height at the center thereof and decreases its height toward the periphery thereof, and yet the end of the top magnetic pole P2 is located in the vicinity of the smaller-height periphery. In this situation, the lower limit of the end width of the top magnetic pole P2 defining the recording track width is about 2 micrometers.

Patent Publication JP-A-7-225917 proposes reduction of the end width of the top magnetic pole P2 by using the process including the step of forming only the end portion of the top magnetic pole P2 before forming the coil covered by the insulator film, followed by the step of forming the rest of the top magnetic pole P2 and the coil. The proposed technique achieves a smaller end width of the top magnetic pole P2 as low as about 1 micrometer.

The inventor fabricated the complex magnetic head including a MR head and an ID head by using the proposed technique. However, the complex magnetic head thus fabricated had the problems described below.

When the end portion of the top magnetic pole was formed by an economic frame plating method, the photoresist frame for the end portion of the top magnetic pole P2 had a shape of character "U" because the end portion is defined at the zero position for a throat height. The throat height is generally defined as the height measured from the periphery of the insulator layer for the coil and the ABS.

As a result, a puddle plating step generally used for forming the top magnetic pole involved poor flow of the plating liquid because of the shape of "U" which does not allow a sufficient flow for the plating liquid due to the closed bottom thereof. Thus, variations in composition of the plated film resulted and the magnetic property of the end portion of the top magnetic pole was degraded, although the magnetic property of the end portion is most important in the ID head. The presence of degradation or variations in the end portion of the top magnetic pole will reduce the throughput of the complex magnetic head.

In addition, a large variation is observed in the throat height itself at the end portion of the top magnetic pole. The control of the throat height is generally important to assure the recording performance of the ID head.

Thus, the complex magnetic head fabricated by the proposed technique did not provide sufficient performance and throughput for the complex magnetic head.

SUMMARY OF THE INVENTION

It is therefore an object of the present invention to provide a method for manufacturing a complex magnetic head including a reproducing MR head and a recording ID head with accurate dimensions and small end width of the top magnetic pole, without using the process for forming the end portion before forming the coil.

The present invention provides a method for fabricating a complex magnetic head including a reproducing magneto-resistance (MR) head having a MR element and bottom and top magnetic shield films sandwiching therebetween the MR element, and a recording inductive (ID) head having a bottom magnetic pole and a top magnetic pole defining an end width.

The method includes the consecutive steps of forming the MR head on a substrate, forming a coil overlying the MR head and sandwiched between a pair of insulator films, forming a frame for defining an inner space on one of the insulator films, forming a top magnetic pole film in the inner space by plating, trimming a portion of the top magnetic pole film to define the end width while leaving the frame, removing the frame to leave a resultant structure, and cutting the resultant structure at a position corresponding to the end width.

In accordance with the method of the present invention, a smaller end width can be obtained substantially without degrading the performance of the complex magnetic head because the trimming step for defining the end width of the top magnetic pole is conducted while leaving the frame which protects the underlying layers against the trimming.

The above and other objects, features and advantages of the present invention will be more apparent from the following description, referring to the accompanying.

PREFERRED EMBODIMENTS OF THE INVENTION

Figure 1:
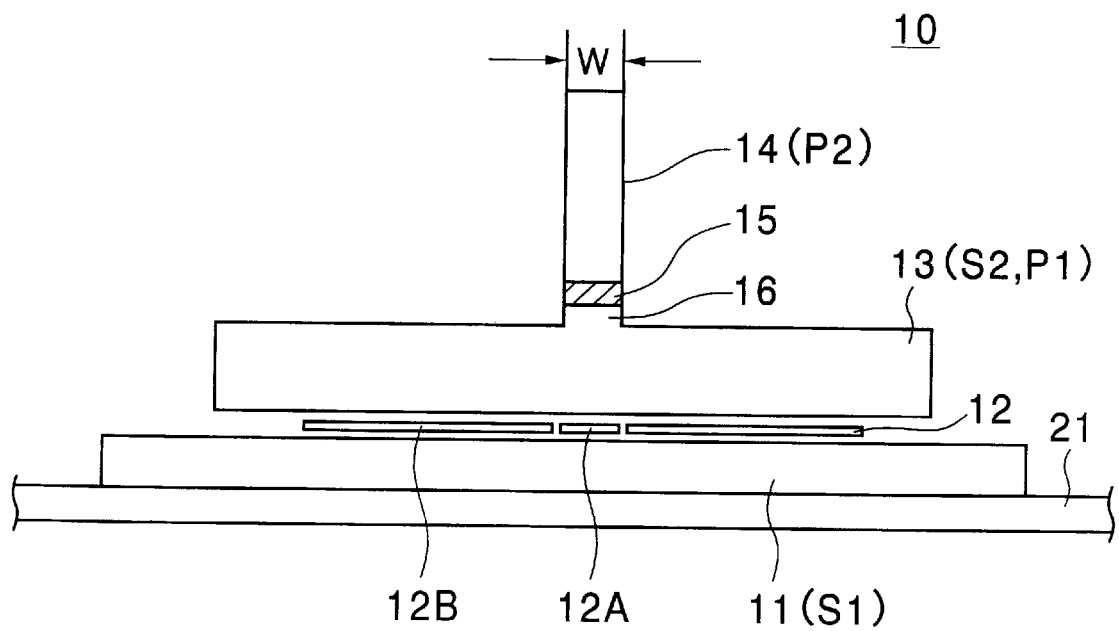
FIG. 1 is an end view of a complex magnetic head according to an embodiment of the present invention, as viewed from a magnetic recording disks.

Referring to FIG. 1, a complex magnetic head 10 fabricated by a process according to an embodiment of the present invention includes a substrate (wafer) 21, and a bottom magnetic shield 11, a MR element having a central area 12A and a peripheral area 12B, a top magnetic shield 13, a coil (not shown) sandwiched between a pair of insulator films and a top magnetic pole 14 which are consecutively formed on the substrate 21. The top magnetic shield 13 has a protrusion 16 on the central region thereof, on which a gap layer 15 made of alumina is disposed to separate the top magnetic shield 13 used as a bottom magnetic pole of the ID head and the top magnetic pole 14 of the ID head.

Figure 2:
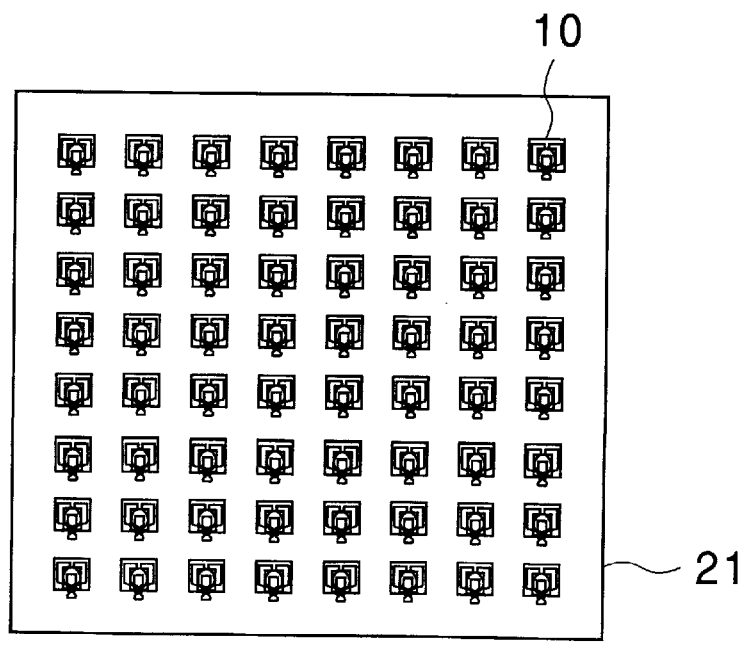
FIG. 2 is a top plan view of a wafer mounting thereon a plurality of complex magnetic heads FIG. 1 at a fabrication step thereof.

Referring to FIG. 2, there is shown a wafer 21 on which a plurality of complex magnetic heads 10 of FIG. 1 are formed. The wafer 21 is made of $Al_2O_3$—TiO complex ceramic material, for example. The complex magnetic heads 10 are separated from one another by dicing the wafer 21 after the filming and patterning steps in the fabrication process according to the present embodiment. The bottom surface obtained by the dicing is subjected to polishing to define an ABS.

Referring to FIGS. 3A to 3D, there is shown top plan views of a portion of the wafer on which the complex magnetic head of FIG. 1 is formed, for showing the process according to the embodiment.

Figure 3A:
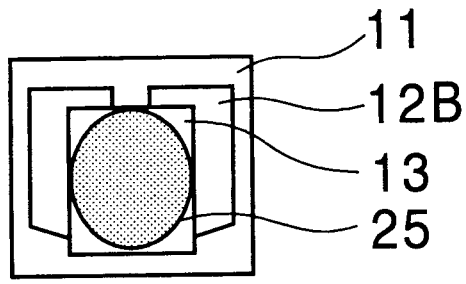
FIGS. 3A to 3D are side views of the complex magnetic head of FIG. 1, showing consecutive fabrication steps thereof.

In FIG. 3A, a Co—Ta—Zr film is first formed on the wafer by sputtering to a thickness of 1 micrometer, followed by patterning thereof to form a bottom magnetic shield film 11. Subsequently, a 80-nm-thick insulator film made of alumina is formed by sputtering for use as a first reproducing magnetic gap. Thereafter, a MR head is formed which has the central area 12A (FIG. 1) and the peripheral area 12B including magnetic poles and a magnetic bias layer. The central area of the MR head has a layered structure including a 30-nm-thick Ni-Mn film, a 3-nm-thick Co—Fe film, 2.5-nm-thick Cu film, and a 6-nm-thick spin valve Ni—Fe film. The magnetic bias layer in the peripheral area 12B of the MR head has a layered structure including a 10-nm-thick underlying Cr film, a 40-nm-thick permanent magnet Co—Cr—Pt film, and a 5-nm-thick contact Ta film and a 100-nm-thick Au film.

After a 60-nm-thick alumina film is formed by sputtering for use as a second reproducing magnetic gap, a 2-$\mu$m-thick Ni—Fe film pattern is formed by a frame plating process for use as a top shield film 13 which also act as a bottom magnetic pole of the ID head. Thereafter, a 0.25-$\mu$m-thick alumina film 15 (FIG. 1) is formed by sputtering for use as a recording magnetic gap, followed by forming a recording coil 25, covered by a photoresist insulator film, for generating a recording magnetic field in the recording head, to thereby obtain the structure of FIG. 3A.

Figure 3B:
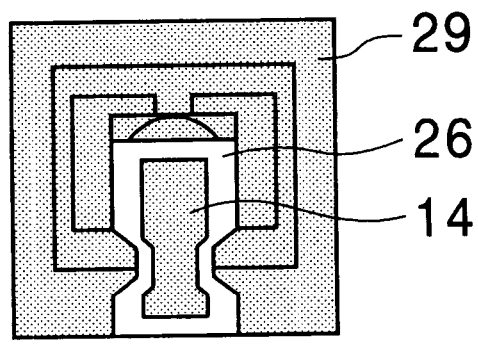

Thereafter, a photoresist frame 26 is formed by patterning using a mask pattern. A Ni—Fe film for use as a top magnetic pole 14 is then formed by a plating process inside the photoresist frame 26 together with a portion 29 outside the photoresist frame 26. Thus, the structure shown in FIG. 3B is obtained.

Figure 3C:
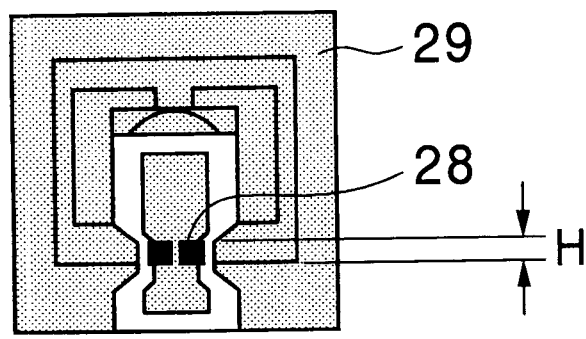

While leaving the photoresist frame 26 as it is, a trimming process is performed using a FIB (focused ion beam) etching method at the locations indicated by numeral 28, as shown in FIG. 3C, for defining the end width of the top magnetic pole P2 in the ID head. The locations 28 are later determined as the end face of the complex magnetic head. The end width of the top magnetic pole P2 defines the recording track width on a magnetic recording disk. The photoresist frame 26 left during the trimming operation affords the protection of the underlying films against the trimming step using the FIB method. In the trimming step, the top magnetic pole 14, inner edge of the photoresist frame 26, the alumina film 15 acting as magnetic gap and the protrusion 16 (FIG. 1), as viewed from the top, are selectively etched.

Figure 3D:
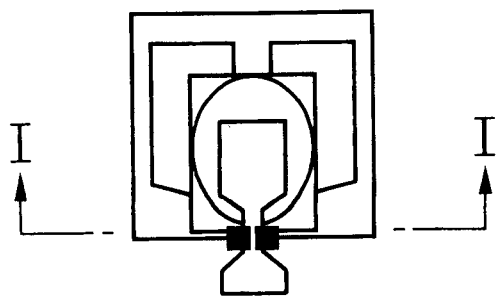

Subsequently, the area for the photoresist frame 26 is entirely covered by another photoresist film, followed by etching the plated Ni—Fe film 29 formed outside the photoresist frame 26 by a selective chemical etching, to leave the top magnetic pole 14 formed inside the photoresist frame 26, as shown in FIG. 3D. The photoresist frame 26 is slightly etched by the FIB trimming at the inner edge thereof in the vicinity of the locations 28, with the outer edge thereof being left. In the chemical etching step, the photoresist frame 26 remaining after the FIB trimming step protects the top magnetic pole 14 inside the photoresist frame 26 against the etching solution. Thereafter, the photoresist frame 26 is removed, followed by formation of a 30-$\mu$m-thick alumina film and electrode pads, to obtain a plurality of elements for the complex magnetic heads. The elements for the complex magnetic heads are separated from one another by dicing the wafer. The separated elements are then polished to obtain a mirror surface for the ABS at the location indicated by line I—I. FIG. 1 is taken along line I—I in FIG. 3D.

Figure 4:
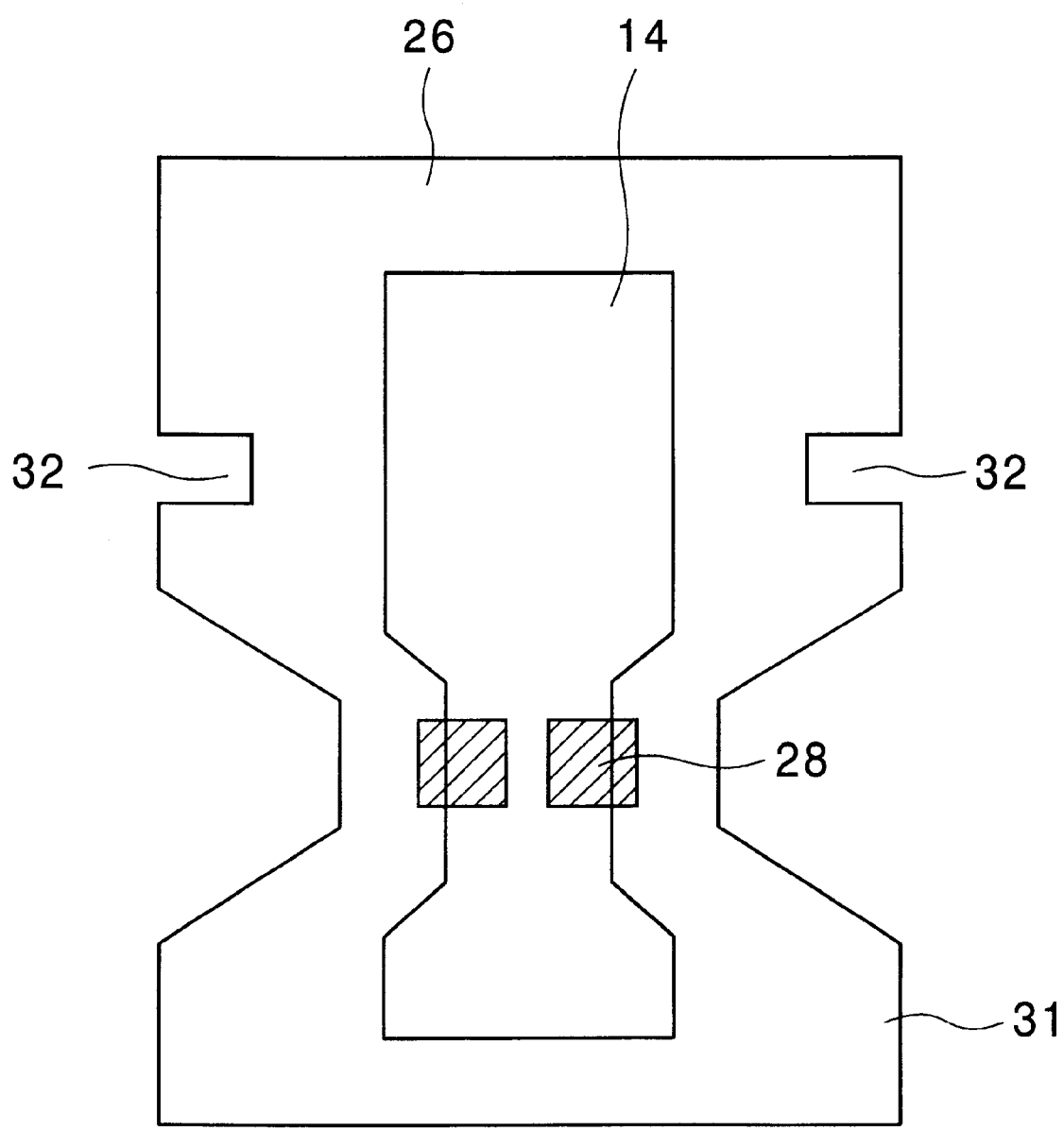
FIG. 4 is a top plan view of an example of the photoresist frame used in the fabrication process for the complex magnetic head of FIG. 1.

Referring to FIG. 4, there is shown an example of the photoresist frame 26. As described above, the photoresist frame 26 is formed by patterning using a mask pattern, and is used for defining the external shape of the top magnetic pole P2 (14) formed by the plating. The trimming step for defining the end width of the top magnetic pole is performed while leaving the photoresist frame 26 for protecting the underlying films.

The photoresist frame 26 is partly removed by the trimming at the inner edges thereof in the vicinities of locations 28, with the outer edges and other portion of the photoresist frame being left after the trimming. The left portion protects the top magnetic pole 14 against an etching liquid during a subsequent chemical etching step for removing the plate film 29 outside the photoresist frame 26 selectively from the top magnetic pole 14 inside the photoresist film 26. The photoresist film 26 has alignment marks 32 for positioning of the trimming process using an image processing.

The fabrication process according to the embodiment allows the end width of the top magnetic pole to be formed with an accurate dimension less than 2 micrometers, which dimension is desired for the recording track width in a magnetic recording disk of a high recording density. By adjusting the conditions for the FIB trimming, the protrusion 16 of the bottom shield film may be aligned with the top magnetic pole 14, which allows an improved recording operation for suppressing deviation of the recording magnetic flux from the recording track width.

An alternate structure may be formed by adjusting the conditions for the FIB trimming, wherein the protrusion 16 is not formed on the top shield film. In addition, the bottom shield film 11 may be other soft magnetic films such as a Ni-Fe film, a Co-based amorphous film, a Fe- or Co-based micro-crystal film or a sendust film instead of the Co—Ta—Zr film.

The MR film 12 may be any spin-valve film generally used in the art. The present invention can be applied to a MR film using a general anisotropic MR effect, such as Ni—Fe film, and a specific MR film using a ferromagnetic tunnel effect junction MR effect.

The top shield film 13 may be a Co-based amorphous film instead of the Ni—Fe film. The top magnetic pole may be made of soft magnetic materials such as Ni—Fe—Co.

Since the above embodiments are described only for examples, the present invention is not limited to the above embodiments and various modifications or alterations can be easily made therefrom by those skilled in the art without departing from the scope of the present invention.

What is claimed is:

1. A method for fabricating a complex magnetic head including a reproducing magneto-resistance (MR) head having a MR element and bottom and top magnetic shield films sandwiching therebetween the MR element, and a recording inductive (ID) head having a bottom magnetic pole and a top magnetic pole defining an end width, said method comprising the consecutive steps of forming the MR head on a substrate, forming a coil overlying the MR head and sandwiched between a pair of insulator films, forming a frame for defining an inner space on one of the insulator films, forming a top magnetic pole film in the inner space by plating, trimming a portion of the top magnetic pole film to define the end width while leaving the frame in place on said one of the insulator films, removing the frame to leave a resultant structure, and cutting the resultant structure at a position corresponding to the end width.

2. The method as defined in claim 1, wherein said trimming step includes a focused ion beam etching.

3. The method as defined in claim 1, wherein said trimming step removes an inner edge of the frame and leaves an outer edge of the frame.

4. The method as defined in claim 1, wherein the frame has an alignment mark thereon for said trimming step.

5. The method as defined in claim 1, wherein the frame is made of photoresist film.

6. The method as defined in claim 1, wherein said top magnetic shield film acts as said bottom magnetic pole.

* * * * *